United States Patent [19]
Pen et al.

[11] Patent Number: 5,188,736
[45] Date of Patent: Feb. 23, 1993

[54] PROCESS FOR THE SEPARATION AND RECOVERY OF EXTRACTANT FROM SPENT SOLVENT

[75] Inventors: Ben-Li Pen; Dah-Ping Wang; Ying-Chu Hoh; Kuo-Hao Tsao, all of Tao Yuan, Taiwan

[73] Assignee: Institute of Nuclear Energy Research, Taiwan

[21] Appl. No.: 750,311

[22] Filed: Aug. 27, 1991

[51] Int. Cl.⁵ ...................... B01D 11/00; B01D 11/04
[52] U.S. Cl. ................................... 210/634; 210/638; 423/10; 423/70; 252/631
[58] Field of Search ............... 252/625, 626, 631, 632, 252/364; 423/10, 11, 18, 70; 210/634, 638; 562/8; 203/17, 18, 19

[56] References Cited

U.S. PATENT DOCUMENTS

| | | | |
|---|---|---|---|
| T970,007 | 5/1978 | McCullough et al. | 423/10 |
| 3,711,591 | 1/1973 | Hurst et al. | 423/10 |
| 4,180,545 | 12/1979 | McCullough et al. | 423/10 |
| 4,207,294 | 6/1980 | Hirono | 423/10 |
| 4,255,396 | 3/1981 | Kim | 423/54 |
| 4,302,427 | 11/1981 | Beny et al. | 423/10 |
| 4,382,066 | 5/1983 | Rose | 423/10 |
| 4,432,946 | 2/1984 | Ginisty et al. | 423/10 |
| 4,442,071 | 4/1984 | Lieser et al. | 252/631 |
| 4,490,336 | 12/1984 | Worthington et al. | 423/10 |
| 4,544,530 | 10/1985 | Tsai et al. | 423/10 |
| 4,765,834 | 8/1988 | Ananthapadmanabhan | 423/8 |

*Primary Examiner*—Theodore Morris
*Assistant Examiner*—Edward Squillante
*Attorney, Agent, or Firm*—Burns, Doane, Swecker & Mathis

[57] ABSTRACT

A new chemical separation process was developed in this invention using 2-methoxyethanol or methyl collosolve (MCS) and ethylene glycol (EG) as separation agents, to separate the valuable extractants such as di(2-ethylhexyl) phosphoric acid(D2EHPA), tri n-octyl-phosphine oxide (TOPO) from spent solvent and to recover the extractants. The process comprises separation and recovery sections. In the separation section the extractants were removed by the polar solution from spent solvent based on the difference of miscibilities. In the recovery section, the polar solution loaded with extractants was distillated under vacuum to remove MCS as a distillate and water was added to the bottom product to facilitate the separation of the extractants. By using this novel process, 99% of D2EHPA and 70% of TOPO in the spent solvent were separated and 98% of D2EHPA was recovered. MCS and EG can be regenerated and reused in the process.

7 Claims, 2 Drawing Sheets

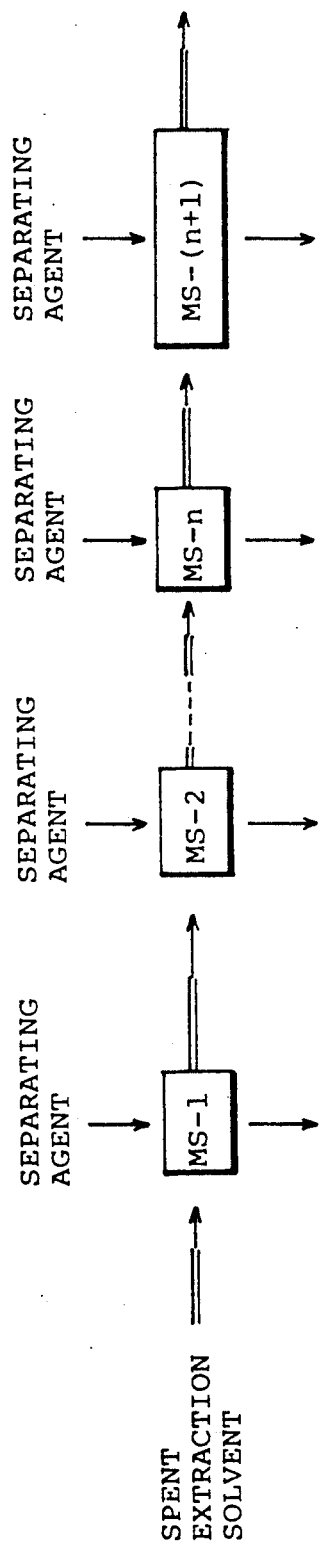

PROCESS FOR THE SEPARATION AND RECOVERY OF EXTRACTANT FROM SPENT SOLVENT

BACKGROUND OF THE INVENTION

In teh hte teh hte a hydrometallurgical process, the solvent employed in the extraction of metals is made up by mixing the extractant with the diluent. Since extractants are very expensive and of a great variety, the selection of an exact extractant for use must depend on the specific nature of the preparation process. Among the many extractants, the acidic di(2-ethylhexyl)phosphoric acid(D2EHPA) and 2-ethylhexylphosphoric acid (PC-88A) are extensively used because of their ability to extract a great variety of metal ions, such as in the recovery of vanadium, zinc and zirconium in chemical industries, as well as in the recovery of radioactive uranium, molybdenum and isotopes in nuclear industries. In some circumstances, for instance, in the extraction of uranium in, a small quantity of trioctyl phosphine oxide (TOPO) is added to D2EHPA to enhance the extraction. There are also many kinds of diluents, such as: toluene, cyclohexane and kerosene, among which kerosene, being the less expensive, has been the most frequently used. The extraction solvent prepared in an appropriate concentration has a good stability, which even after use for a long period of time will still retain its extraction property. Therefore, for production operation in a plant such extraction solvent is a non-consumable chemical. However, when the plant is closed down or when special circumstances arise where it is necessary to dispose of the solvent (herein below known as spent solvent), inevitable problems arise regarding how to deal with the large amount of the organic solvent and whether it is possible to recover the valuable extractants. Especially, if the spent solvent contains radioactive elements so that is must be listed as nuclear wastes, then it becomes an even greater burden for the technology and economic storage management under the regulation of the Atomic Energy Law.

In the following, the extraction of natural uranium will be used as an example to explain the management of spent solvent and the possible methods for the treatment of the spent solvent. There are a large number of plants in the world for uranium extraction from wet process phosphoric acid. These plants were built during the period when uranium prices were relatively high. But these plants, after operating for several years, were no longer economically efficient because of the continuous decline in uranium price. Therefore, they had to be shut down or closed altogether. A residue material that was left behind in large amounts during the decommissioning of the plant was extraction solvent. Because of technical difficulties in the treatment, the extraction solvent along with the spent solvent is currently stored. However, storage is not a good solution because of reasons such as high cost, fire and leakage risk. It has been disclosed in the literature that attempts have included three approaches to treatment of solvents and one is by burning the solvents. However, burning must take place under strictly controlled conditions so that the spent solvent is burned at high temperature and destroyed into gas and ashes without secondary pollution. In reality, however, there will still be a problem with this method, that is, any phosphorous compounds formed during the burning operation will corrode the equipment material. A second approach relies on property transfer. The spent solvent, after filtration and purification, can be sold to similar factories. However by this approach, although there might not be any technical problems, the chance of success generally is very slim because of the suitability of the preparation to potential buyers. Now there is the third approach to the recovery process. The extractants are separated from the kerosene and are kept in storage for ready use while the remaining diluent kerosene after purification can be reused in the process. Comparing the economic benefits after the three methods, the recovery approach would be the best for the treatment of spent solvents. Nevertheless, because the relevant technology still remains under development, at present most of uranium extraction plants that have been closed down deal with their spent solvents temporarily by storage.

As described above, since the spent solvents contain D2EHPA and TOPO, methods currently under consideration on how to recover the said extractant still do not go beyond the solution distribution technique and the distillation technique. In the solution distribution method, difference in the solution pressure of the extractants in relation to the different solvents is used to perform the separation function and the utilizable solvents include nonpolar solvents, such as: kerosene, benzene and carbon tetrachloride and polar solvents, such as: water and ethanol. It has been disclosed in the literature that there are methods of separation of D2EHPA and mono(2-ethylhexyl) phosphoric acid(M2EHPA) with the above nonpolar solvents and polar solvents. In the distillation method, the extractants and kerosene are separated by differences in their respective boiling points. However, since the boiling point of kerosene is about 207° C. and that of the extractant about 218° C. (D2EHPA), the two boiling points are very close to each other and the difference is in the range of 15° C. The effect of separation is therefore not very satisfactory. Also because both the boiling points are high and there is a larger consumption of energy, the method has not been popularly employed.

SUMMARY OF THE INVENTION

In view of the foregoing, the present invention provides a new chemical process for the recovery of extractants from the spent solvent with combination of features of the solution distribution technique and the distillation method. The process according to the invention involves first under the solution distribution method utilizing a polar solvent as the separating agent to transfer the extractants to the above wherein the polar solvent has a a boiling point much lower than that of kerosene, that is, a boiling point of about 125° C. and later by the distillation method the extractants are recovered at a relatively lower temperature under vacuum distillation. This new chemical process shows effectiveness of separation of D2EHPA to be 99% and of TOPO to be 70%, and gives a recovery percentage of D2EHPA as 98%.

The separating agent utilized in the process has the solubility effect against the extractants of non-chelated metal ions but not the extractants of chelated metal ions. Because of this characteristic the present process is industrially applicable in the recovery of extractants and it is also applicable to the treatment of the radioactive spent solvent.

BRIEF DESCRIPTION OF THE DRAWINGS

The above and other objects of the invention will be best understood from the following description to be taken in conjunction with the accompanying drawings, in which:

FIG. 2 is a diagram showing the operating scheme of the n+1 crosscurrent mixer-settler of the process of the invention.

DETAILED DESCRIPTION OF THE INVENTION

Figure 1:
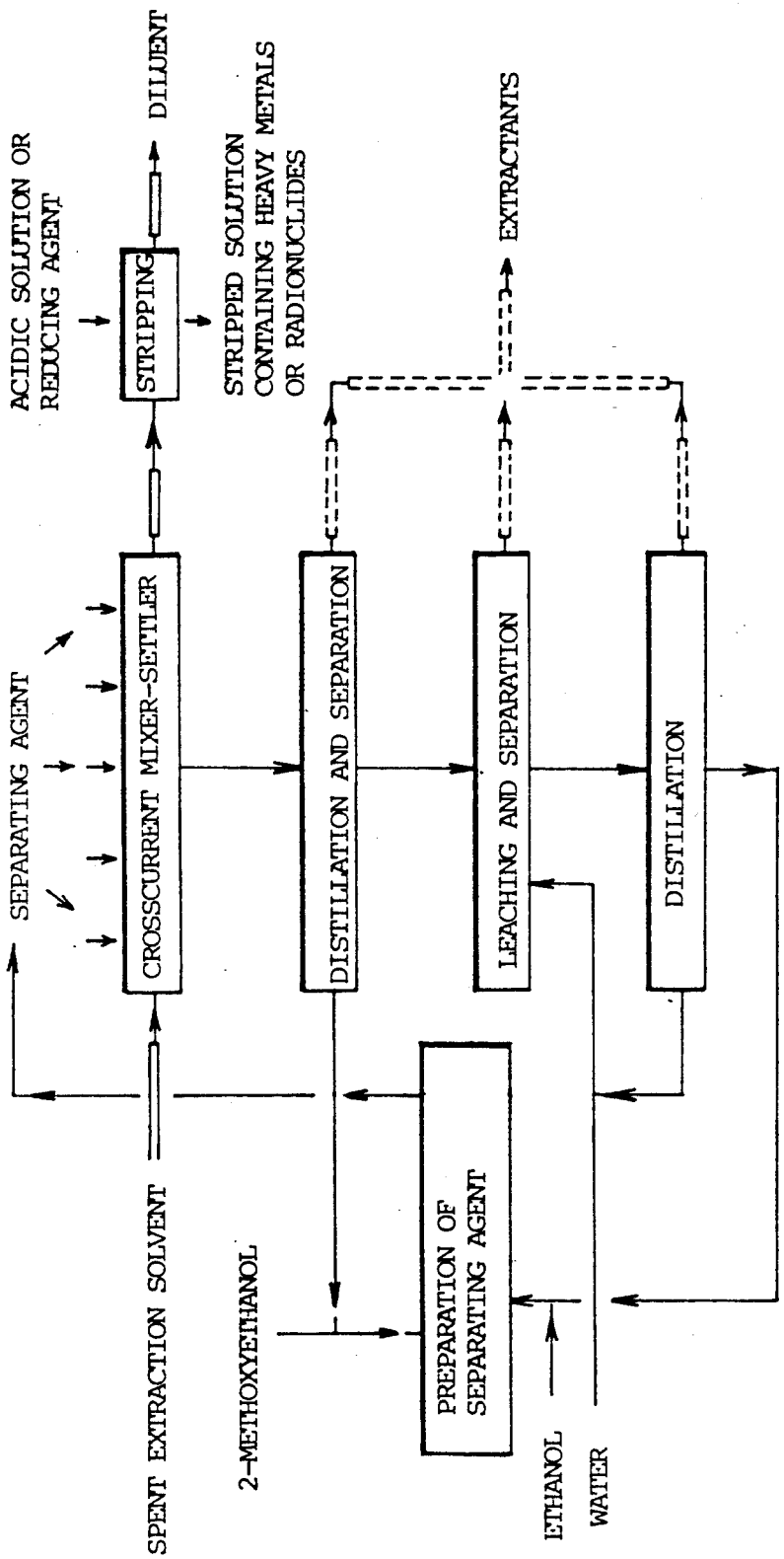
FIG. 1 shows a flow diagram of the process for separating and recovering extractants from the spent solvent in accordance with the invention.

The molecular formula of D2EHPA is $[(C_4H_9CH(C_2H_5)CH_2]_2HPO_4$ and that of PC-88A is $[C_4H_9CH(C_2H_5)CH_2]_2HPO_3$, both of which are acidic extractants. On the otherhand, the molecular formula of TOPO is $(n-C_8H_{17})_3PO$ which is a co-extractant. While in the former formulas there contains more of the long-chain hydrocarbon groups and less of the hydroxyls, in the latter formula there are all hydrocarbon groups. When these extractants are mixed with different solvents two types of effects, miscible and immiscible, will be produced and if miscible it is because there is developed an affinity between the groups in the extractant molecules and the solvent. Based on this miscibility principle, it should be possible therefore to separate the already mixed extractants and kerosene if only a suitable separating solution can be selected. Judging from the molecular characteristic of the aforesaid extractants and kerosene, because of a stronger affinity of the hydrophilic polar solutions to the hydroxyls and also because of their ability to separate out easily into two layers with the spent solvent, these hydrophilic polar solutions should be a suitable separating agent.

The polar solutions employed as separating agent in the process of the present invention are 2-methoxyethanol and ethylene glycol. 2-methoxyethanol(MCS), which has a separating function, is the major component, and the molecular formula is $C_3H_8O_2$ containing one each of the functional groups of —OH and —OCH$_3$, although an organic fluid MCS is completely water-miscible. Ethylene glycol (EG) has no separating function but is able to inhibit the amount of kerosene that will be dissolved in the separating agent during the separation of extractants. Accordingly, during preparation EG in part is added into the separating agent. The molecular formula of EG is $C_2H_4(OH)_2$ containing a functional group of —OH. Or the principle of miscibility MCS and Eg should comply with the requirements in the separation of extractants.

The flow diagram illustrating the chemical process for separating and recovering D2EHPA and TOPO is as shown in FIG. 1, in which the double line denotes a light phase where spent extraction solvent floats on the upper layer, the actual line denotes a heavy phase where separating agent (prepared from the polar solution) is deposited at the lower layer and the dotted line denotes the extractants recovered. The process substantially comprises two sections, the first section of which is the separation of extractants from kerosene, wherein the spent extraction solvent and the separating agent are thoroughly crosscurrently mixed with each other in a mixer-settler separator. Owing to the difference of miscibilities, the greater part of extractants, D2EHPA, M2EHPA (very much less in content in the spent extraction solvent) and TOPO, from the spent extraction solvent enters the separating agent and forms a water-immiscible organic liquid. This water-immiscible liquid contains a total of these components of MCS, EG and the extractants. The second section of the present process is the recovery, which may be divided into three stages as follows. In stage 1, the water-immiscible solution containing D2EHPA and TOPO is distilled and the solution after distillation separates out into two liquid phases, one phase representing the separating agent and the other, the extractants. The two phases are thus settled and separated into light and heavy liquid phases and the liquid phase that floats on the upper layer is the extractant. Upon removal, the extractant layer produces the recovery product. During distillation, MCS of low boiling point is evaporated out and on condensation, is accumulated and recycled for use in the process again. At this time, EG and a small amount of the extractants that has been dissolved in EG are left in the separating agent. By continuing treatment of the separating agent, the remaining small amount of extractants is thus recovered. In stage 2, water is added into the remaining separating agent and the solution is agitated and then allowed to stand. During this time, Since it is strongly hydrophilic, EG starts to absorb water thereby forcing a small part of the miscible extractants to separate from it and forming light and heavy liquid phases. The extractants float on the upper layer. After withdrawal of the extractants, there is left in the process liquid only the separating agent, which is the water containing EG. In stage 3, water is removed from EG by vacuum distillation and the concentration is restored so that EG can be reused in the circulation. The extractant which accumulates at different stages is defined as product.

When the present process is applied to the treatment of spent radioactive extraction solvent, the procedure can be altered slightly to achieve the purpose of reducing the for example, as shown in FIG. 1, the spent extraction solvent (by now a greater part is a diluent) which has been treated in mixer-settlers is stripped with reducing acid to remove any metallic elements contained in the extractants. The spent solvent is then treated with polar solution, that is, the first section operation is repeated several times until all of the radioactive nuclear species have been stripped and absorbed by the acid solution. The polar solution recovers after each treatment for many times can be accumulated and combined together for an operation to recover the extractants.

Of the extractants employed in the present experiment, D2EHPA is of over 94% purity containing less than 2% of M2EHPA and TOPO is of about 90% purity. Kerosene, which is locally available, is scrubbed with acid solution before use.

1. Regarding the determination of an appropriate polar solution composition, MCS has the ability to dissolve extractants. In use, however, MCS will not only dissolve in the extractants, it will also dissolve in some kerosene. For this reason, in order to reduce the amount of kerosene from being carried in, EG is added to MCS. The influence of the amount of EG added is shown in Table 1, from which it can be recognized that pure EG has no effect on the dissolution of the extractants and that pure MCS, however, dissolves in too much kerosene. The carry-in rate in the Table indicates the ratio of extractants and kerosene which have simultaneously been dissolved in the separating agent. Value of this rate relies mainly on the physical property of miscibility, but the operating technique in their separation from each other also has its influence. In the multiple stages separation operation of the carry-in rate increases with the increase in the separating agent. It is possible to separate the extractants when volume ratio of EG in the separating agent is below 66.7%. When the volume ratio exceeds that proportion, there will be no separating effect and the separation rate will decrease gradually with the increase in EG.

In the following examples illustrating the present invention, for concentration of the extractant in the data D2EHPA is quantitatively measured by the potentiometric titration method and TOPO is quantitatively measured by the vapor-phase chromatograph technique.

TABLE 1

Influence on separation rate of D2EHPA and carry-in rate of kerosene by composition of the separating agent

| Separation rate or carry-in rate (%) | | When separating agent = MCS + EG, the ratio of EG content (in Vol. %) | | | | | | | | |
|---|---|---|---|---|---|---|---|---|---|---|
| | | 0 | 16.7 | 20 | 25 | 33 | 50 | 66.7 | 77 | 100 |
| Single-stage operation | D2EHPA - separation rate | 39.1 | 32.6 | 28 | 21.7 | 20 | 6.4 | 2.5 | 0 | 0 |
| | Carry-in rate | 20 | 8.6 | 6.6 | 5.1 | 3 | 0.4 | 0 | 0 | 0 |
| Five-stage continuous operation | D2EHPA - separation rate | 98.6 | 95.7 | — | 80.2 | — | 40.4 | — | — | — |
| | Carry-in rate | 60 | 25 | — | 20 | — | 10 | — | — | — |

2. Volume ratio of polar solution to spent extraction solvent in mixture

Being smaller in specific weight to the polar solution, the spent extraction solvent floats on the upper layer and forms the light phase. Based on the past experimental results, when two phases are mixed and if the light phase is greater than the heavy phase in volume, there would be disadvantages to the recovery of the extractants. Therefore, in order to obtain a good mixing and separating effect, volume ratio between the light and the heavy phases is set at 1.

3. Separation of extractants, PC-88A and TOPO

MCS has the ability to separate many kinds of extractants in which, in addition to D2EHPA, MCS can also separate extractants like PC-88A and TOPO as summarized in Table 2, however, D2EHPA being the highest in the separation rate. If two extractants are mixed together and the separation is performed, it will be shown from the experiments by four-stage continuous operation that when D2EHPA reaches a separation rate of 95% the separation rate of TOPO is 70%. The results are summarized in Table 3. Logically, therefore, if an increase in number of the operating stages has resulted in the separation rate of D2EHPA reaching 99%, the separation rate of TOPO will also increase.

TABLE 2

Use of MCS alone in separation of PC-88A and TOPO

| Stage No. | PC-88 Concentration (M) | TOPO Concentration (M) |
|---|---|---|
| Raw material | 0.5 | 0.125 |
| 1 | 0.38 | 0.074 |
| 2 | 0.25 | 0.037 |
| 3 | 0.17 | 0.023 |
| 4 | 0.09 | 0.012 |
| Separation rate | 82% | 90.4% |

TABLE 3

Separation rate of D2EHPA and TOPO when MCS alone is used

| Stage No. | D2EHPA Concentration (M) | TOPO Concentration (M) |
|---|---|---|
| Raw material | 0.496 | 0.1474 |
| 1 | 0.279 | 0.12 |
| 2 | 0.111 | 0.093 |
| 3 | 0.053 | 0.067 |
| 4 | 0.025 | 0.044 |
| Separation rate | 95% | 70% |

4. Operation of separation and recovery 16.7% polar solution containing EG is used as the separating agent, the proportion of spent extraction solvent to polar solution is 1:1 by volume. The liquids are reacted under agitation in a mixer-settler apparatus and the operation is carried out crosscurrently. Under this condition, the spent extraction solvent is fed in from the 1-stage and fed out after passing continuously through various stages, whereas the polar solution is fed in and out independently at each of the stages. The spent extraction solvent is subjected to operation of multiple stage mixer-settlers at room temperature, the extractants and a small portion of kerosene are dissolved in the polar solution and the remaining diluent leaves the preparatory process at the last stage. The polar solution discharged at the various stages contains extractants of different concentrations, which are however all combined together for recovery. During recovery operation, the polar solution is first distillated under the degree of vacuum of 30 mmHg at temperature of 50° C. to remove MCS as a distillate. Extractants are obtained in the first round of recovery and thereafter treatment of EG follows. At this time, there is still dissolved in EG a small amount of extractants, to which water is added at room temperature under agitation. The solution is then allowed to stand for 24 hrs until when it is separated to form two phases, the liquid at the upper layer being the re-recovered extractants. Water is removed from the water-containing EG by reduced pressure distillation to restore its original concentration and EG together with MCS in proportion can then be reused in the process.

In accordance with the invention, experiments were carried out initially in a processing amount of 50 cc with separating funnels and after positive results had been confirmed the experiments were then conducted at an enlarged scale with flows of 500 cc and 1000 cc, respectively and using tabletop laboratory equipment. Hereinbelow are description and results on three examples of the novel process of the invention, of which the first example is on the separation and recovery steps and the

EXAMPLE 1

The spent solvent sample was obtained from a local commercial uranium-recovery phosphate plant and the acid sample has a brownish black color containing very few suspension substances. The extractants were 0.46M D2EHPA and 0.1M TOPO and the agitation tank had a 1.2 l capacity and 5 stages of mixer-settlers. Time of agitation in each stage was about 5 min and after agitation the time for allowing the solution to stand would depend on necessity that the solution was completely settled and separated. Since the settling and separation steps in the last few stages were slow, there required about 1 hr and in the rest of the stages results were obtained on settlement and separation in 30 min for each stage. The vacuum distillation equipment was of a rotary type and was heated in an oil bath and was equipped with a temperature control apparatus and a sprinkle-type vacuum apparatus. Results on the concentration of D2EHPA in the stages, the change in volume of the spent solvent and the change in uranium concentration before and after the experiment are shown in Table 4.

TABLE 4

| Stage No. | Raw Material | The changes in volume and concentration of the spent solvent in stages when EG in the separating agent is 16.7% | | | | | | |
|---|---|---|---|---|---|---|---|---|
| | | 1 | 2 | 3 | 4 | 5 | 6 | 7 |
| Volume (ml) | 500 | 455 | 422 | 402 | 385 | 377 | 368 | 359 |
| D2EHPA concentration (M) | 0.46 | 0.295 | 0.182 | 0.111 | 0.083 | 0.043 | 0.022 | 0.01 |
| Uranium concentration (ppm) | 31 | — | — | — | — | — | — | 43 |

It can be recognized from Table 4 that the concentration of D2EHPA in the spent solvent decreases with increase in the operating stage number, also the volume of D2EHPA decreases accordingly. However, uranium, on the other hand, shows an increase in concentration. The reason for the decrease in volume is because the extractant was dissolved in the separating agent during the recovery process, and also because of miscibility, a part of kerosene entered the separating agent. The separating agent so collected was subjected to the foregoing steps of distillation to give a recovery solution with a volume of 141 ml, the concentration of D2EHPA of about 1.6M and the concentration of TOPO of about 0.25M. Based on D2EHPA the over-all recovery rate was equal to 98.5%. In the present example, because only the raw material and the recovery solution were analyzed, the concentration of TOPO was not listed stage-wise in the table.

EXAMPLE 2

Operation and procedure conditions were the same as in Example 1. However, because there was a scale-up of the processing amount and the agitation equipment must be enlarged, a 2.5 l capacity agitating apparatus instead was used. The spent solvent was likewise obtained from the local commercial uranium-recovery phosphate plant. However, because of difference in the order of batches there were slight variations in concentration of the uranium and the extractant. This experiment was aimed at proving that a scale-up in the equipment has no effect on the procedure conditions. The results obtained are as shown in Table 5.

TABLE 5

| Stage No. | Raw Material | Changes in volume and concentration of the spent extraction solvent at stages when EG in the separating agent was 16.7% | | | | | | | | |
|---|---|---|---|---|---|---|---|---|---|---|
| | | 1 | 2 | 3 | 4 | 5 | 6 | 7 | 8 | 9 |
| Volume (cc) | 1000 | 945 | 891 | 846 | 815 | 803 | 791 | 776 | 764 | 758 |
| D2EHPA concentration (M) | 0.42 | 0.28 | 0.20 | 0.12 | 0.082 | 0.05 | 0.024 | 0.014 | 0.008 | 0.005 |
| Uranium concentration (ppm) | 47 | — | — | — | — | — | — | — | — | 62 |

It was found that the experimental results in Table 5 were consistent with those of the previous example. Since the concentration of D2EHPA had reached equilibrium at all stages of mixers-settlers, there showed no relations to the processing amount. From the changes before and after in the concentrations it was possible to calculate that 99.1% extractant had been separated. The present experiment was to demonstrate the reliability of separating operation, whereas for the recovering steps of distillation, because the results were very much positive the steps had been omitted from the Table. For changes in the separating concentration of TOPO, since it was believed to be similar to D2EHPA and also for the reason that analysis was not easy, no analysis on concentration had been given.

EXAMPLE 3

In the present experiment, the procedure conditions were the same as in Example 2, however, the process was carried out with a spent extraction solvent of higher uranium concentration. The purpose of this was to demonstrate the effect of uranium concentration relative to the separation. The results obtained are as in Table 6.

TABLE 6

| Stage No. | Raw Material | Changes in volume and concentration of the spent extraction solvent at stages when EG in the separating agent was 16.7% | | | | | | | |
|---|---|---|---|---|---|---|---|---|---|
| | | 1 | 2 | 3 | 4 | 5 | 6 | 7 | 8 |
| Volume (cc) | 1000 | 950 | 905 | 850 | 823 | 820 | 802 | 790 | 780 |
| D2EHPA concentration (M) | 0.466 | 0.298 | 0.21 | 0.17 | 0.11 | 0.076 | 0.044 | 0.022 | 0.01 |
| Uranium concentration (ppm) | 700 | — | — | — | — | — | — | — | 897 |

In the present Example, because of a higher uranium concentration the changes in concentration in the separation of D2EHPA were, unlike the previous two times, slightly higher. Based on the changes before and after in the uranium concentration, it was discovered that the extractant containing the uranium element had not been dissolved by the separating agent. That the changes in D2EHPA concentration were higher and the phenomenon of an undissolved extractant containing the uranium element prove that the inference that the aforesaid functional groups result in miscibility is correct.

5. Stripping metallic ions

Owing to the polar solvent which lacks sufficient ability to dissolve the extractant carrying uranium ions, there is therefore a rise in the uranium ion concentration of the treated spent solvent. At this time, a reducing agent of an appropriate acidic solution can be used in the stripping of the said solvent to transfer the uranium ions to the acidic solution. In the case of a spent solvent in the preparation of uranium extraction by phosphoric acid, the reducing agent used is phosphoric acid containing ferrous iron. In the process of the present invention the said reducing agent had been used in stripping, which clearly shows the transfer of uranium to the acidic solution.

6. Reuse of MCS

In the process of extractant recovery, MCS is simultaneously regenerated and this distilled and regenerated separating agent can be used repeatedly. Table 7 shows a comparison of the effects of D2EHPA separation at each time when MCS had been used repeatedly for 8 times. From these values it can be recognized that there is no effect on the separating ability.

TABLE 7

| Repeated use of MCS in separation of D2EHPA | | |
|---|---|---|
| Number of times | Concentration before separation (M) | Concentration after separation (M) |
| 1 | 0.5 | 0.21 |
| 2 | 0.5 | 0.22 |
| 3 | 0.5 | 0.21 |
| 4 | 0.5 | 0.20 |
| 5 | 0.5 | 0.23 |
| 6 | 0.5 | 0.22 |
| 7 | 0.5 | 0.23 |
| 8 | 0.5 | 0.23 |

From the foregoing description, one skilled in the art can easily ascertain the essential characteristics of this invention, and without departing from the spirit and scope thereof, can make various changes and modifications of the invention to adapt it to various usages and conditions.

We claim:

1. A process for separating an extractant from a diluent in a spent extraction solvent and recovering same by using a polar solution or mixed polar solution as a separating agent, wherein said extractant comprises di(2-ethylhexyl) phosphoric acid, tri n-octyl-phosphine oxide, 2-ethylhexyl phosphoric acid, or mixtures thereof, wherein said separating agent comprise 2-methoxy ethanol, ethylene glycol or mixtures thereof, wherein the diluent comprises toluene, cyclohexane, kerosene or mixtures thereof, and wherein said process comprises the steps of:
   (1) selecting said separating agent comprised of said polar solution or mixed polar solution to produce a first water-miscible and a water-immiscible phase when combined with said solvent;
   (2) mixing said separating agent and said spent extraction solvent to produce said first water-miscible and water-immiscible phases, which separate into two layers upon settling, and whereby this mixing and settling step is repeated several times;
   (3) removing said first water-immiscible phase and extracting metal ions contained therein;
   (4) distilling said first water-miscible phase at a temperature between the boiling points of said polar solution and said extractant, whereby the polar solution is evaporated from a remaining second water-miscible phase and collected separately;
   (5) adding water to said remaining second water-miscible phase, then stirring and allowing the solution to stand for a sufficient period of time for said extractant to separate from said second water-miscible phase and collecting said extractant; and
   (6) removing water from the second water-miscible phase of step (5) and combining the resulting product with the distillate polar solution of step (4) for re-use in a recovery process.

2. A process according to claim 1, said solution comprised of 2-methoxyethanol or a mixture of 2-methoxyethanol and an ethylene glycol, wherein said ethylene glycol is added to said solution at a ratio (v/v) of 0 to 66.7%.

3. A process according to claim 1, wherein the first water-miscible phase is comprised of said separating agent and said extractant, and wherein the water-immiscible phase is comprised of kerosene and a residual amount of extractant, in which the extractant in said water-immiscible phase comprises metal ions.

4. A process according to claim 1, wherein a composition comprised of a concentrated acid or a reducing agent is used to remove said water-immiscible phase from said first water-miscible phase to extract the metal ions contained therein.

5. A process according to claim 1, wherein distilling proceeds at atmospheric pressure or in a vacuum.

6. A process according to claim 1, wherein the extractant is an acidic extractant comprising di-(2-ethylhexyl) phosphoric acid.

7. A process according to claim 1, wherein the separating agent is mixed with the spent extraction solvent and settled by a crosscurrent mixer-settler operating at room temperature and atmospheric pressure.

* * * * *